(12) United States Patent
Yeom et al.

(10) Patent No.: US 9,302,570 B2
(45) Date of Patent: Apr. 5, 2016

(54) RAIN SHIELD DEVICE FOR VEHICLE

(71) Applicant: DONG-A UNIVERSITY RESEARCH FOUNDATION FOR INDUSTRY-ACADEMY COOPERATION, Busan (KR)

(72) Inventors: Jeongkuk Yeom, Busan (KR); Jungmin Youn, Busan (KR); Chanwon Hwang, Busan (KR); Seunglok Baek, Busan (KR); Minwoong Lee, Busan (KR); Jungsik Choi, Busan (KR); Sangyun Shin, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 0 days.

(21) Appl. No.: 14/646,750

(22) PCT Filed: Feb. 20, 2013

(86) PCT No.: PCT/KR2013/001306
§ 371 (c)(1),
(2) Date: May 22, 2015

(87) PCT Pub. No.: WO2014/081081
PCT Pub. Date: May 30, 2014

(65) Prior Publication Data
US 2015/0283887 A1    Oct. 8, 2015

(30) Foreign Application Priority Data
Nov. 22, 2012    (KR) .................. 10-2012-0133311

(51) Int. Cl.
*B60J 7/00* (2006.01)
*B60J 5/04* (2006.01)

(52) U.S. Cl.
CPC .................................... *B60J 5/0494* (2013.01)

(58) Field of Classification Search
CPC .............. B60J 7/12; B60J 5/04; B60J 5/0494
USPC ................. 160/370.21; 296/99.1, 152, 136.1, 296/136.11; 13/88.05, 88.07; 135/88.05, 135/88.07
See application file for complete search history.

(56) References Cited

U.S. PATENT DOCUMENTS

| 3,795,412 A * | 3/1974 | John | ................... B60R 21/08 180/274 |
| 7,086,684 B2 * | 8/2006 | Glaser | ................... B60J 11/00 296/99.1 |
| 8,079,629 B2 * | 12/2011 | Raynor | ................ B60J 5/0494 135/88.07 |
| 8,240,323 B2 * | 8/2012 | Lee | ................... A45B 11/00 135/20.1 |
| 9,090,153 B1 * | 7/2015 | Boyd | ................... B60J 11/06 |

FOREIGN PATENT DOCUMENTS

| JP | 2003-002053 A | 1/2003 |
| JP | 2006-213238 A | 8/2006 |
| JP | 2009-234554 A | 10/2009 |
| KR | 20-1999-0011413 U | 3/1999 |
| KR | 20-2000-0010106 U | 6/2000 |

OTHER PUBLICATIONS

International Search Report for PCT/KR2013/001306 mailed Jun. 21, 2013 from Korean Intellectual Property Office.

* cited by examiner

*Primary Examiner* — Dennis H Pedder
(74) *Attorney, Agent, or Firm* — Paratus Law Group, PLLC

(57) ABSTRACT

An automotive rain shield system including: an air compressor that injects and sucks air to operate a rain shield; a shield module including a lift tube that operates an X-shaped frame so that the rain shield like a tent expands, by expanding when the air compressor injects air into the lift tube, and a rain shield tube that expands when the air compressor injects air into the rain shield tube so that the rain shield like a tent expands; an external switch that inputs a signal for making the air compressor inject air, outside a vehicle; and a door sensor that senses a door of the vehicle closing so that the air compressor returns the rain shield by sucking the air.

7 Claims, 4 Drawing Sheets

RAIN SHIELD DEVICE FOR VEHICLE

CROSS REFERENCE TO PRIOR APPLICATION

This application is a National Stage Patent Application of PCT International Patent Application No. PCT/KR2013/001306 (filed on Feb. 20, 2013) under 35 U.S.C. §371, which claims priority to Korean Patent Application No. 10-2012-0133311 (filed on Nov. 22, 2012), which are all hereby incorporated by reference in their entirety.

BACKGROUND OF THE INVENTION

1. Field of the Invention

The present invention relates to an automotive rain shield system, and more particularly, to an automotive rain shield system that can be efficiently mounted and used on a vehicle by automatically operating and stowing a rain shield using an air compressor and tubes.

2. Description of the Related Art

It takes a little time to get in and out of a vehicle and it doesn't matter to take long time to get in and out of a vehicle in normal times, but when it rains, a person is exposed to the rain as long as the time. Further, when a person gets into a vehicle with a wet umbrella in the rain, the rainwater on the umbrella causes inconvenience such as getting the interior of a vehicle wet.

Further, in a heavy rain such as a shower, even without an umbrella, a person is necessarily fully exposed to the rain while getting into and out of a vehicle. Patients, the handicapped, or the old who takes more time to get in and out of a vehicle further feels this inconvenience.

Further, when a person with a heavy load gets in a vehicle, he/she gets in the vehicle after put the load into the vehicle or gets in the vehicle and then puts the load into the vehicle, so not only he/she, but the load is exposed to rain.

In order to solve this problem, there is a rain shield system for allowing a person to more conveniently get in a vehicle by blocking rain in the related art. The system includes a frame box fixed to the roof of a vehicle and a rain shield that has the function of a sun visor and can be drawn out from the frame box, and the rain shield is drawn out and blocks rain by a series of control processes.

However, the rain shield system has a poor external appearance, requires a box that is separated manufactured and then mounted on the roof of a vehicle, and requires remodeling of much of the original shape of a vehicle for installation.

Further, the rain shield system illustrated in FIG. 1 requires a small motor for operating the rain shield, so it is difficult to manufacture and install the system.

SUMMARY OF THE INVENTION

The present invention has been made in an effort to solve the above-described problems of the automotive rain shield system associated with prior art.

An aspect of the present invention provides an automotive rain shield system that can be efficiently mounted and used on a vehicle by automatically operating and stowing a rain shield using an air compressor and tubes.

An aspect of the present invention also provides an automotive rain shield system that includes tubes roiled by springs at both ends of a rain shield like a tent and can be minimized in size and efficiently used, because when air is injected into the tubes by an air compressor, the tubes are unrolled and the rain shield operates, while when the air is sucked, the rain shield is stowed.

An aspect of the present invention also provides an automotive rain shield system that can ensure a height, effectively support the load of rain, and protect a driver and devices inside a vehicle, by using an X-shaped frame for operating a rain shield.

It should foe noted that objects of the present invention are not limited to the above-mentioned object and other objects of the present invention will be apparent to those skilled in the art from the following descriptions.

According to an aspect of the present invention, there is provided an automotive rain shield system that includes: an air compressor that injects and sucks air to operate a rain shield; a shield module including a lift tube that operates an X-shaped frame so that the rain shield like a tent expands, by expanding when the air compressor injects air into the lift tube, and a rain shield tube that expands when the air compressor injects air into the rain shield tube so that the rain shield like a tent expands; an external switch that inputs a signal for making the air compressor inject air, outside a vehicle; and a door sensor that senses a door of the vehicle closing so that the air compressor returns the rain shield by sucking the air.

Here, the shield module may be mounted on a door of a vehicle, and when a signal for making the air compressor inject air is inputted, the stowed lift tube is expanded by the injected air and lifts the X-shaped frame, so the rain shield is lifted and the rain shield tube expands, thereby expanding the rain shield retracted.

And the air compressor may inject and suck air and has a capacity of 200 to 300 LPM.

And the shield module may include: an X-shaped frame that is expanded upward by a lift tube expanded by air injected by the air compressor and retracted down by the lift tube contracting by air sucked by the air compressor; a guide rail that is coupled to the lower end of one frame member of the X-shaped frame by a hinge shaft and is coupled to the lower end of the other frame member of the X-shaped frame by a movable pin, and guides the X-shaped frame when the X-shaped frame is moved; a shield that is expanded or folded by shield tubes coupled to the upper ends of the X-shaped frame; and a coupling pin that couples both members of the X-shaped frame so that the X-shaped frame moves in a coupling groove.

And the guide rail may be curved so that the X-shaped frame is mounted and stowed on a vehicle, and the X-shaped frame may be manufactured in the same shape as the guide rail.

And the shield module may include an X-shaped frame housing for receiving the X-shaped frame, the lift tube may be disposed in the X-shaped frame housing, and as the lift tube expands or retracts, the X-shaped frame may expand upward or may be stowed into the X-shaped frame housing.

And the shield module may include a shield housing coupled to upper ends of the X-shaped frame, shield tubes are connected, to both ends of the shield housing, and the shield is disposed between the shield tubes, so as the shield tubes retract, the shield tubes and the shield are stowed into the shield housing, and as the shield tubes expand, the shield tubes and the shield expand out of the shield housing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, exemplary embodiments of an automotive rain shield system according to the present invention will be described in detail.

The features and advantages of the automotive rain shield system according to the present invention will be made clear through the following detailed description of exemplary embodiments.

Figure 1:
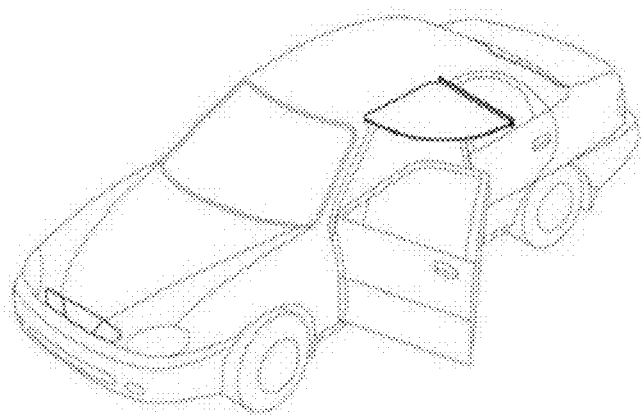
FIG. 1 is a view illustrating an automotive rain shield system, of the related art.
Figure 2:
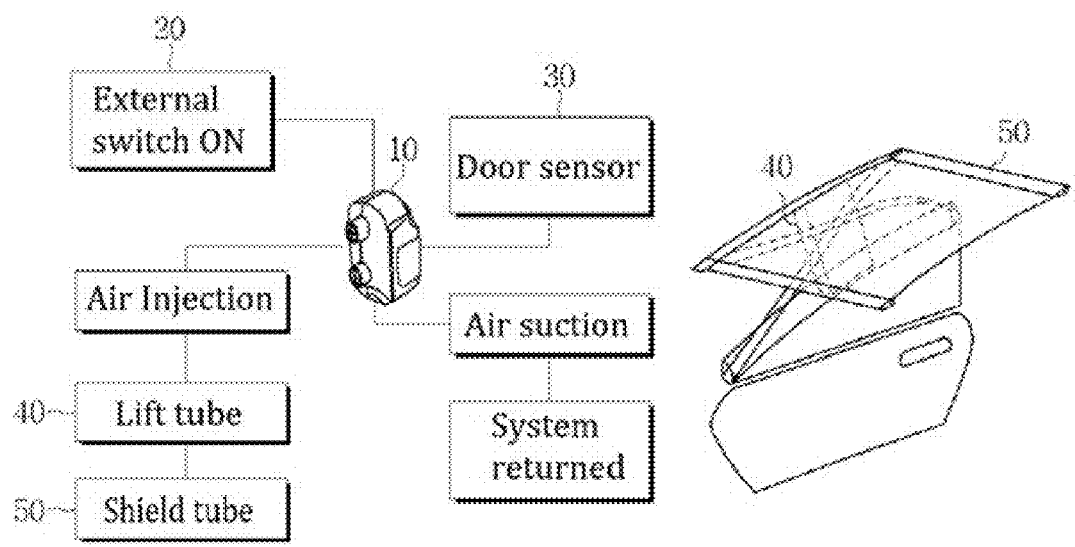
FIG. 2 is a diagram illustrating the entire configuration of an automotive rain shield system according to the present invention.

FIG. 2 is a diagram illustrating the entire configuration of an automotive rain shield system according to the present invention.

The automotive rain shield system of the present invention includes tubes rolled by springs at both ends of a rain shield like a tent, and when air is injected into the tubes by an air compressor, the tubes are unrolled and the rain shield operates, while when the air is sucked, the rain shield is stowed, so the system is minimized in size and can be efficiently used.

The automotive rain shield system according to the present invention includes: an air compressor 10 that injects and sucks air to operate a rain shield; an external switch 20 that inputs a signal for making the air compressor 10 inject air outside the vehicle so that a lift tube 40 and a shield tube 50 expand; a door sensor 30 that senses a door of the vehicle closing so that the air compressor 10 returns the rain shield by sucking the air; the lift tube 40 that operates an X-shaped frame so that the rain shield like a tent expands, by expanding when the air compressor 10 injects air into the lift tube; and the rain shield tube 50 that expands when the air compressor 10 injects air into the rain shield tube so that the rain shield like a tent expands.

Here, an input unit such as a switch for operating the air compressor 10 may be disposed inside the vehicle so that a person can operate the rain shield system when he/she gets out of the vehicle.

Here, the X-shaped frame for operating the rain shield expands and lifts the rain shield to a predetermined height, so it can improve convenience for a driver.

Figure 3A:
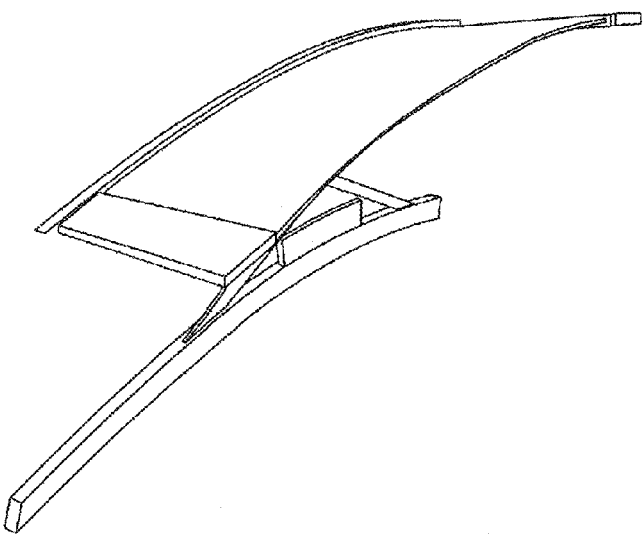
FIG. 3A is a view illustrating the external appearance of an automotive rain shield system according to an exemplary embodiment of the present invention.
Figure 3B:
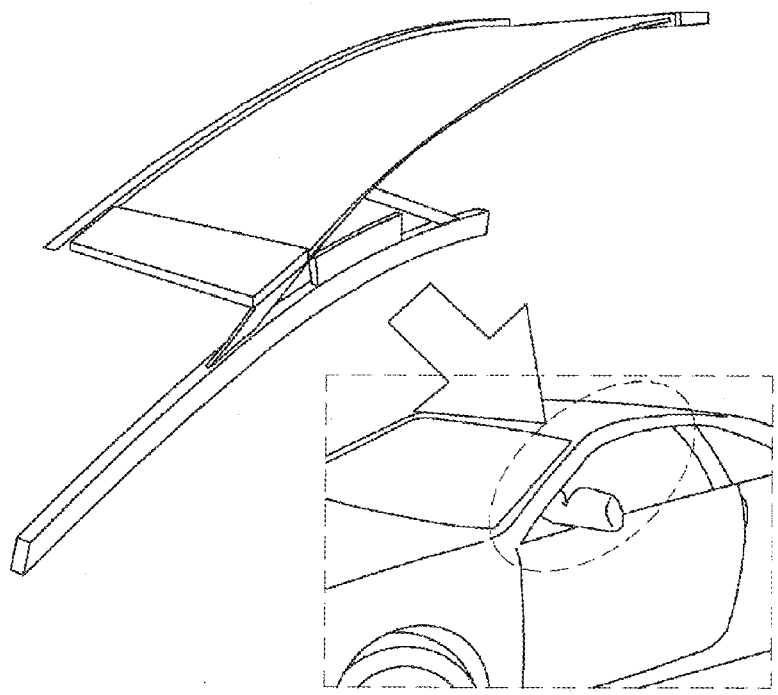
FIG. 3B is a view illustrating a way of mounting the automotive rain shield system according to an exemplary embodiment of the present invention on a vehicle.

And FIG. 3A is a view illustrating the external appearance of an automotive rain shield system according to an exemplary embodiment of the present invention and FIG. 3B is a view illustrating a way of mounting the automotive rain shield system according to an exemplary embodiment of the present invention on a vehicle.

The rain shield system according to the present invention is preferably mounted on a front door of a vehicle, as in FIG. 3B, font may be mounted on a rear door.

When it is mounted on a door of a vehicle and a signal for making the air compressor 10 inject air is inputted, the stowed lift tube 40 is expanded by the injected air and lifts the X-shaped frame, so the rain shield is lifted and the rain shield tube 50 expands, thereby expanding the rain shield retracted (thin waterproof fabric).

The configuration of the automotive rain shield system according to the present invention is described in detail hereafter.

Figure 4:
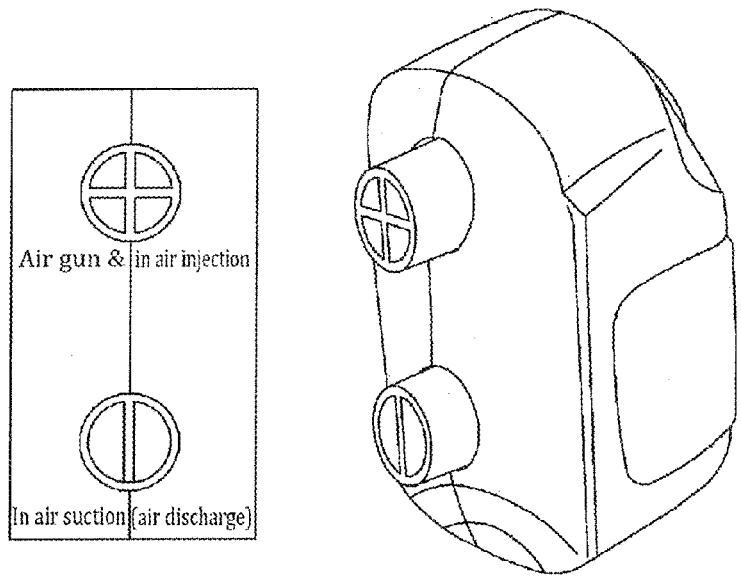
FIG. 4 is a view illustrating an example of an air compressor used in the automotive rain shield system according to the present invention.

FIG. 4 is a view illustrating an example of an air compressor used in the rain shield system according to the present invention.

Figure 5:
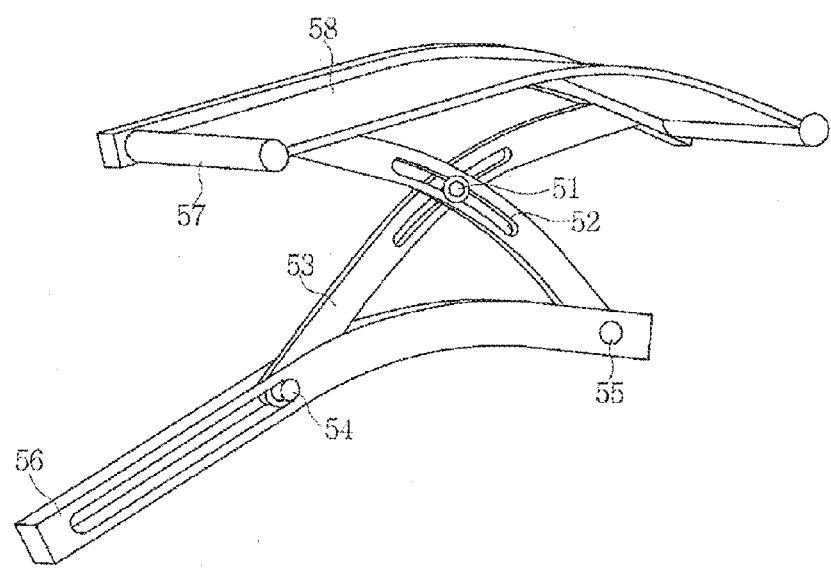
FIG. 5 is a view illustrating in detail the automotive rain shield system according to an exemplary embodiment of the present invention.
Figure 6:
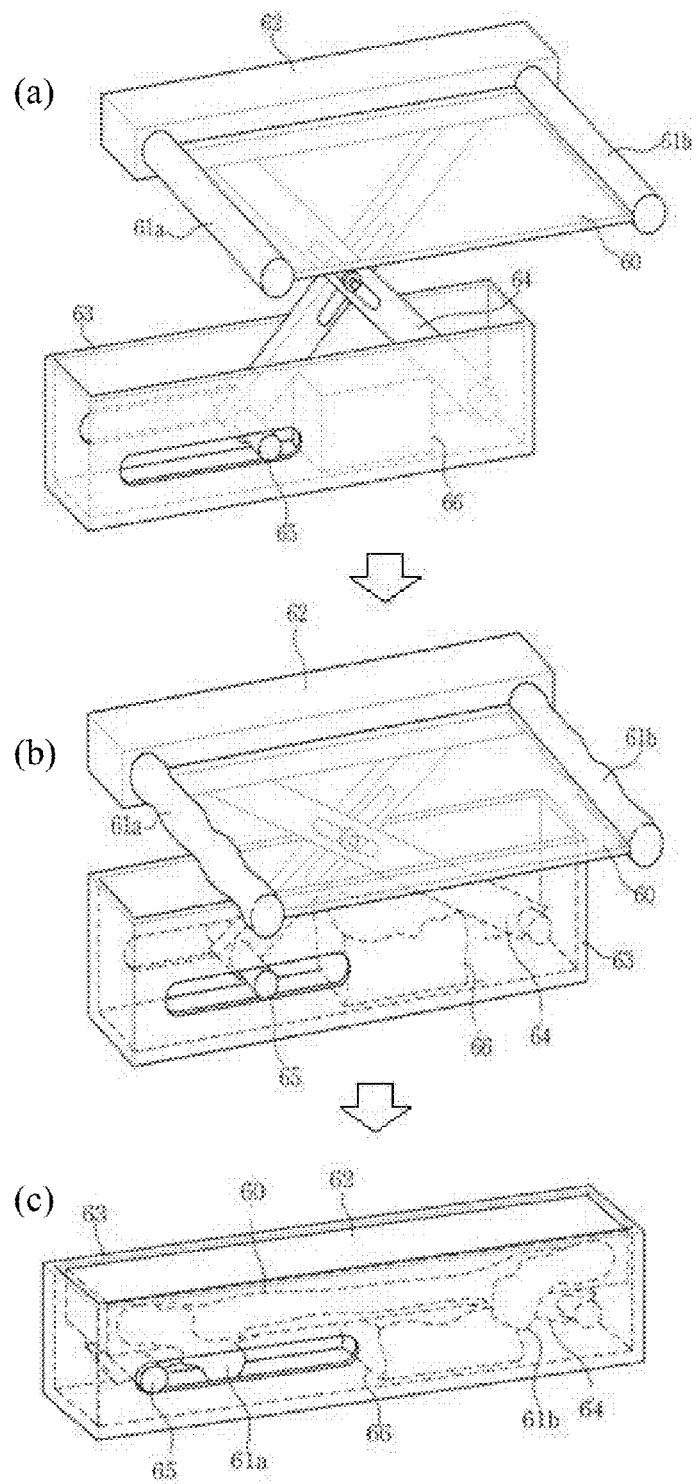
FIG. 6 illustrates a retraction process of the automotive rain shield system according to another exemplary embodiment of the present invention.

FIG. 5 is a view illustrating in detail the automotive rain shield system according to an exemplary embodiment of the present invention and FIG. 6 is a view illustrating in detail the automotive rain shield system according to another exemplary embodiment of the present invention.

FIG. 4 illustrates an air compressor used in the automotive rain shield system according to the present invention and it is preferable that the air compressor injects and sucks air and has a capacity of 200 to 300 LPM.

A shield module operated by the air compressor, as in FIG. 5, includes: an X-shaped frame 53 that is expanded upward by a lift tube (not illustrated) expanded by air injected by the air compressor and retracted down by the lift tube contracting by air sucked by the air compressor; a guide rail 56 that is coupled to the lower end of one frame member of the X-shaped frame 53 by a hinge shaft 55 and is coupled to the lower end of the other frame member of the X-shaped frame 53 by a movable pin 54, and guides the X-shaped frame 53 when the X-shaped frame 53 is moved; a shield 58 that is expanded or folded by shield tubes 57 coupled to the upper ends of the X-shaped frame 53; and a coupling pin 51 that couples both members of the X-shaped frame 53 so that the X-shaped frame 53 moves in a coupling groove 52.

Here, the guide rail 56 is curved so that the X-shaped frame 53 is mounted and stowed on a vehicle.

Similarly, it is preferable that two members of the X-shaped frame 53 are manufactured in the same shape, based on the shape of the guide rail 56, in respect of stowing and operating.

And FIG. 6 illustrates in more detail a way of stowing the automotive rain shield system according to the present invention, in which a lift tube 66 is disposed in an X-shaped frame housing 63, so when the lift tube 66 expands or retracts, the X-shaped frame 64 expand upward or is stowed into the X-shaped frame housing 63.

And a shield housing 62 is coupled to the upper ends of the X-shaped frame 64, shield tubes 61a and 61b are connected to both ends of the shield housing 62, and the shield 60 is disposed, between the shield tube 61a and the shield tube 61b.

In this configuration, as the shield tubes 61a and 61b retract, the shield tubes 61a and 61b and the shield 60 are stowed into the shield housing 62, and as the shield tubes 61a and 61b expand, the shield tubes 61a and 61b and the shield 60 expand out of the shield housing 62.

And in the X-shaped frame 64, one frame member is coupled, to a guide groove of the X-shaped housing 63 by a movable pin 65 and the other frame member is coupled to the X-shaped frame housing 63 by a hinge shaft.

And the frame members of the X-shaped frame 64 are coupled to each other in the X-shape by a coupling pin and move along coupling grooves for the frame members.

If is preferable that the X-shaped frame, the shield housing, and the X-shaped frame housing are made of acrylic materials, but the materials are not limited to acrylic materials and may be other materials.

The automotive rain shield system of the present invention includes tubes rolled by springs at both ends of a rain shield like a tent, and when air is injected into the tubes by an air compressor, the tubes are unrolled and the rain shield operates, while when the air is sucked, the rain shield is stowed, so the system is minimized in size and can be efficiently used.

As set forth above, according to exemplary embodiments of the invention, the automotive rain shield system according to the present invention has the following effects.

First, it is possible to automatically operate and stow the rain shield, using the air compressor and the tubes.

Second, it is possible to more efficiently mount and use the system on a vehicle by automatically operating and stowing the rain shield.

Third, it is possible to ensure a height and effectively support the load of rain by using the X-shaped frame for operating the rain shield.

Fourth, it is possible to expand and lift the rain shield to a predetermined height, using the X-shaped frame for operating the rain shield, so it is possible to improve convenience for a driver.

Fifth, it is possible to protect a driver and devices inside a vehicle, using the rain shield like a tent.

Sixth, it is possible to minimize the size of the system by disposing tubes at both ends of the rain shield so that when the air compressor injects air into the tubes, the tubes expand and operate the rain shield, and when the air compressor sucks the air, the rain shield is stowed.

Seventh, it is possible to minimize fuel consumption of a vehicle by reducing the weight of the system and reduce defects in use by simplifying the structure.

While the present invention has been illustrated and described in connection with the exemplary embodiments, it will be apparent to those skilled in the art that modifications and variations can be made without departing from the spirit and scope of the invention as defined by the appended claims.

What is claimed is:

1. An automotive rain shield system comprising:
   an air compressor that injects and sucks air to operate a rain shield;
   a shield module including a lift tube that operates an X-shaped frame so that the rain shield like a tent expands, by expanding when the air compressor injects air into the lift tube, and a pair of rain shield tubes each connected to the rain shield, wherein each rain shield tube expands when the air compressor injects air into the pair of rain shield tubes so that the rain shield like a tent expands;
   an external switch that inputs a signal for making the air compressor inject air, outside a vehicle; and
   a door sensor that senses a door of the vehicle closing so that the air compressor returns the rain shield by sucking the air.

2. The automotive rain shield system of claim 1, wherein the shield module is mounted on a door of the vehicle, and
   when the signal for making the air compressor inject air is inputted, the lift tube is expanded by the injected air and lifts the X-shaped frame, so the rain shield is lifted and each of the pair of rain shield tubes expands, thereby expanding the rain shield retracted.

3. The automotive rain shield system of claim 1, wherein the air compressor injects and sucks air and has a capacity of 200 to 300 LPM.

4. The automotive rain shield system of claim 1,
   wherein the X-shaped frame is expanded upward by the lift tube expanded by the air injected by the air compressor and retracted down by the lift tube contracting by air sucked by the air compressor,
   wherein the shield is expanded or folded by the pair of rain shield tubes respectively coupled to upper ends of the X-shaped frame,
   wherein the shield module further includes:
   a guide rail that is coupled to a lower end of one frame member of the X-shaped frame by a hinge shaft and is coupled to a lower end of the other frame member of the X-shaped frame by a movable pin, and guides the X-shaped frame when the X-shaped frame is moved; and
   a coupling pin that couples both frame members of the X-shaped frame so that the X-shaped frame moves in a coupling groove.

5. The automotive rain shield system of claim 4, wherein the guide rail is curved, and each frame member of the X-shaped frame and the guide rail have the same curvature.

6. The automotive rain shield system of claim 1, wherein the shield module includes an X-shaped frame housing for receiving the X-shaped frame, the lift tube is disposed in the X-shaped frame housing, and as the lift tube expands or retracts, the X-shaped frame expands upward or is stowed into the X-shaped frame housing.

7. The automotive rain shield system of claim 1, wherein the shield module includes a shield housing coupled to upper ends of the X-shaped frame,
   the pair of rain shield tubes are connected to both ends of the shield housing, and
   the rain shield is disposed between the pair of rain shield tubes,
   so as the pair of rain shield tubes retracts, the pair of rain shield tubes and the rain shield are stowed into the shield housing, and as the pair of rain shield tubes expands, the pair of rain shield tubes and the rain shield expand out of the shield housing.

* * * * *